United States Patent
Houser et al.

[11] Patent Number: 5,886,775
[45] Date of Patent: Mar. 23, 1999

[54] NONCONTACT DIGITIZING IMAGING SYSTEM

[75] Inventors: Guy M. Houser, Bainbridge; Leonard J. Nevulis, Poulsbo; Michael Ajemian, Seattle; William E. Maness, Everett, all of Wash.

[73] Assignee: M+IND, Poulsbo, Wash.

[21] Appl. No.: 815,092

[22] Filed: Mar. 12, 1997

[51] Int. Cl.⁶ .............................. G01L 3/08; G01B 11/24; G01J 3/46
[52] U.S. Cl. .......................... 356/4.01; 356/402; 356/376
[58] Field of Search .................................. 356/3.01–5.15, 356/402, 376

[56] References Cited

U.S. PATENT DOCUMENTS

| | | |
|---|---|---|
| 5,032,023 | 7/1991 | Schneiter . |
| 5,251,156 | 10/1993 | Heier et al. . |
| 5,337,149 | 8/1994 | Kozah et al. ............................ 356/376 |
| 5,394,875 | 3/1995 | Lewis et al. . |

*Primary Examiner*—Stephen C. Buczinski
*Attorney, Agent, or Firm*—Seed and Berry, LLP

[57] ABSTRACT

An apparatus and method for imaging a surface of a target object that produces a three-dimensional image of the target object without mechanical contact from a hand-held, free-motion scanner. In one embodiment, the apparatus has a scanner that an operator manually moves about the target object substantially without restriction. A noncontact distance measuring device is attached to the scanner to measure the distance between the scanner and the target object without mechanically contacting the target object. Additionally, a position tracking system detects the position and orientation of the scanner within the position reference field without mechanically restricting the scanner. In operation, a computer is operatively coupled to the position tracking system and the noncontact distance measuring device to correlate position measurements of the scanner with corresponding distance measurements between the scanner and the target object. The computer generates a three-dimensional image of the target object from surface point measurements of the target object.

40 Claims, 12 Drawing Sheets

NONCONTACT DIGITIZING IMAGING SYSTEM

FIELD OF THE INVENTION

The present invention relates to digitizing the shape of an object, and more particularly, to a digitizer that generates a three-dimensional image of an object with a freely movable scanner and without mechanically contacting the object.

BACKGROUND OF THE INVENTION

Digital imaging systems are used to create two-dimensional and three-dimensional images of objects for reverse engineering, prototyping, computer modeling, animation, graphics applications, inspecting parts, medical procedures, prosthetic device manufacturing and other applications. In prosthetic device manufacturing, for example, an anatomical feature of a specific patient may be digitized to manufacture a custom prosthetic device that comfortably fits the patient. Several digitizing devices and processes are currently available to generate three-dimensional images of objects.

One type of existing digitizing system is a full-contact, free-motion digitizer that has a hand-held probe with a receiver that detects the position of the probe relative to a position reference magnetic field generated by a transmitter. In prosthetic device manufacturing applications, the size and shape of a patient's limb or other anatomical feature is measured by pressing the probe against the patient's skin and scanning the probe over the anatomical feature. The motion tracking system computes the position and orientation of the probe as it moves over the patient's skin to generate a three-dimensional image of the patient's limb. However, because the probe presses against the patient's skin, one problem with the hand-held probe is that it may deflect the skin and produce inaccurate data points that do not correspond to the true size and shape of the patient's limb. As a result, a prosthetic device manufactured according to the data generated by the probe may not comfortably fit the patient. Another problem with this system is that the target object must remain stationary as it is scanned by the probe to prevent inaccurate measurements. Consequently, many medical patients become uncomfortable and may even experience pain during the digitization process because they must remain still for relatively long periods of time.

Another existing digitizing system is a noncontact, restricted-motion digitizer that has a support structure with a guide track, a noncontact displacement sensor mounted to the support structure to travel along the guide track, and a brace to fixedly hold a target object during digitizing. Alternatively, the displacement sensor may be attached to a mechanical arm. The noncontact displacement sensor is generally a laser distance measuring device that measures the displacement between the sensor and the surface of the target object, and the position of the sensor is detected by denoting its position on the guide track or on the mechanical arm. In prosthetic device manufacturing, a patient's limb is strapped to the brace and fixed in place, and the displacement sensor moves along the guide track and scans the patient's limb with a laser beam. The distance measurements from the laser and the position of the laser are correlated by a computer to calculate the surface points of the target object and generate a three-dimensional image.

Although noncontact, restricted-motion digitizers do not deflect the skin of a patient, they are generally large, complex pieces of equipment with many mechanical parts. Moreover, the guide track or the mechanical arm may also restrict the motion of the displacement sensor and prevent the laser beam from scanning portions of the target object. Thus, as with conventional full contact digitizers, patient's are generally uncomfortable or even in pain during the digitizing process because they must hold still while being scanned with the laser.

SUMMARY OF THE INVENTION

The present invention is an imaging system for obtaining data indicative of the surface of a target object, and preferably for creating accurate digital images of target objects from the data. In one embodiment, an imaging device has a freely movable scanner that may be moved about the target object without restriction, a noncontact distance measuring device attached to the scanner, and a position tracking system to detect the position and orientation of the scanner. The noncontact distance measuring device measures the distance between the scanner and the target object without mechanically contacting the target object to prevent inaccurate measurements caused by deflecting the surface of the target object. Also, the position tracking system preferably has an emitter that emits a position reference field about the target object and a first position sensor attached to the scanner that detects the position of the scanner in the position reference field. To generate a plurality of surface point measurements of the target object, the noncontact distance measuring device and the position tracking system are operatively coupled to a host computer that correlates the position measurements of the scanner from the position tracking system with the corresponding distance measurements between the scanner and the target object from the noncontact distance measuring device. The computer preferably processes the surface point measurements to generate polygonal approximations of portions of the target object that together form a three-dimensional image of the target object.

In a preferred embodiment, the scanner has a pistol-shaped housing with a handle and a pointer, and the noncontact distance measuring device is a laser distance measuring device that accurately measures the distance between the scanner and the surface of the target object. The scanner is thus preferably a hand-held scanner that may be manually moved about the target object substantially without restriction. Also in a preferred embodiment, a second position sensor is attached to the target object to detect the position and orientation of the target object within the position reference field. As a result, the target object may also move during scanning because the position tracking system detects the position of both the scanner and the target object. The computer then correlates the position measurements of both the scanner and the target object from the position tracking system with corresponding distance measurements from the laser distance sensor to generate a plurality of surface point measurements indicative of the surface of the target object. The computer preferably processes the surface point measurements to generate a three-dimensional image of the target object.

In additional embodiments of the invention, an optical sensor is attached to the scanner to detect the color of the target object at the surface points scanned by the noncontact distance measuring device. In still another embodiment, an imaging system has a pressure sensing device to measure the pressure required to deflect the surface of the target object. The pressure sensing device has a pressure sensor and a third position sensor that detects the position of the pressure sensing device in the position reference field. Measurements of both the color of the target object and the pressure to deflect the surface of the target object are processed by the computer with the surface point measurements to provide a color image of the target object and the hardness of selected areas of the target object.

DETAILED DESCRIPTION OF THE INVENTION

The present invention is an imaging system for obtaining data indicative of surface shapes of target objects and creating accurate three-dimensional images of target objects. The preferred embodiment of the present invention is particularly useful for imaging anatomical features in the manufacturing of prosthetic devices, such as prosthetic legs, arms and feet. One important aspect of an embodiment of the invention is that the imaging system measures surface points on the target object without mechanically contacting the target object. As a result, the imaging system generally reduces inaccurate measurements caused by deflecting the surface of the target object. Another important aspect of an embodiment of the invention is that the imaging system measures the surface points of the target object from a hand-held, free-motion scanner that may be moved about the target object substantially without restriction. Consequently, even large objects or sections of very large objects may be digitized by simply walking the scanner around the object to scan the surface with the noncontact distance measuring device. Yet another important aspect of an embodiment of the invention is that the target object may move without affecting the accuracy of the measurements. As a result, a preferred embodiment of the invention is accurate, easy and convenient to operate.

Figure 1:
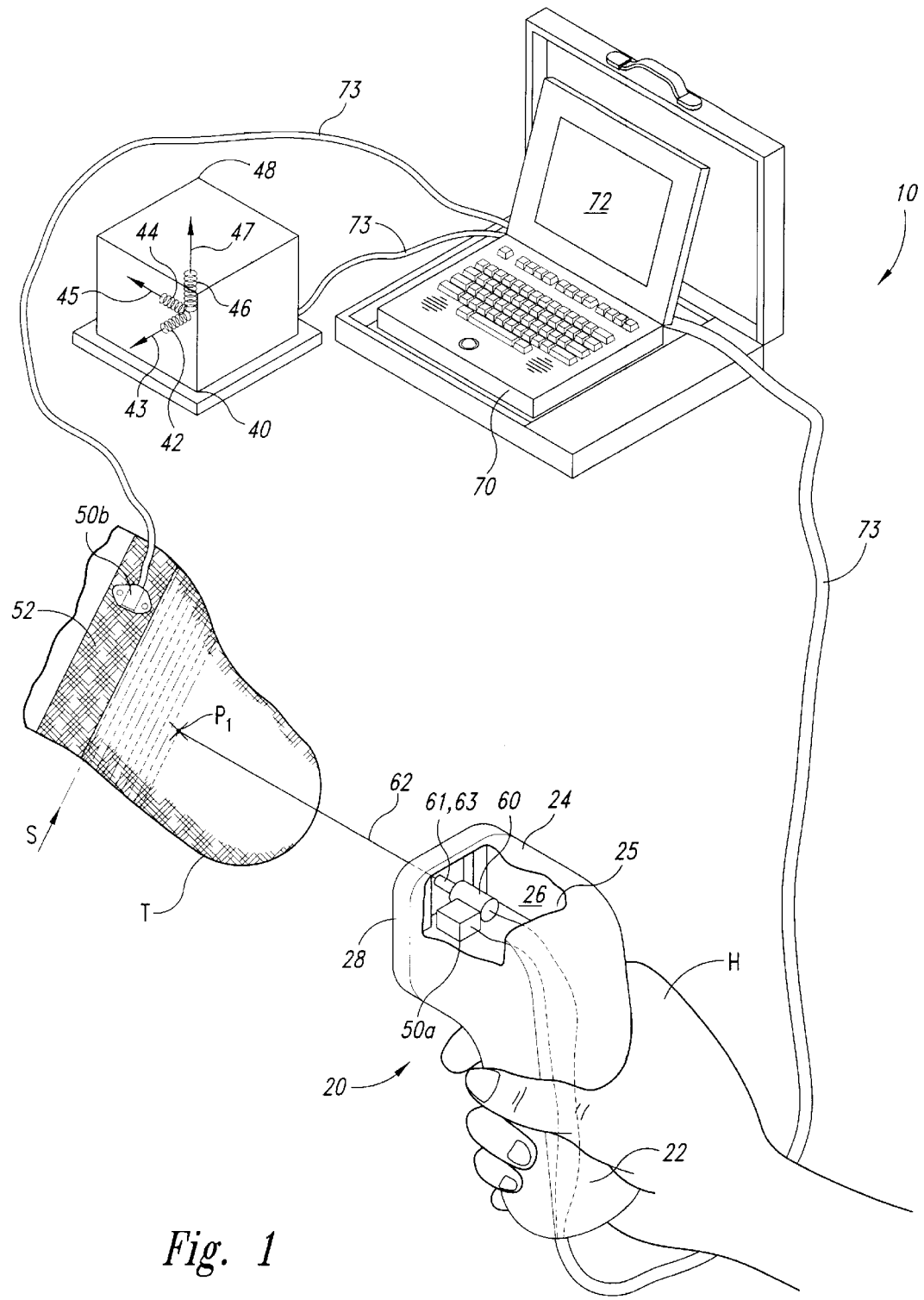
FIG. 1 is an isometric view of an imaging system in accordance with an embodiment of the invention.

FIG. 1 is an isometric view illustrating an imaging system 10 digitizing a target object T in accordance with an embodiment of the invention. The target object T illustrated in FIG. 1 is a stump of a human limb, but it will be appreciated that the imaging system 10 may be used to digitize virtually any object. Thus, even though the present description of the invention primarily describes digitizing the stump of a limb, it will be appreciated that the imaging system 10 has many other applications.

The imaging system 10 preferably has a hand-held scanner 20 with a handle 22 and a pointer 24. The handle 22 is sized and shaped to be easily grasped by a hand H of an operator, and the pointer 24 is preferably positioned at an oblique angle with respect to the handle 22. The pointer 24 preferably has a housing 25 defining a cavity 26 that is open at the distal end of the pointer, or a cover 28 may be attached to the end of the housing 25 to cover the cavity 26. In contrast to restricted-motion scanners that move along a guide track or are attached to a mechanical arm, the operator may walk about the target object T with the scanner 20 and freely move the scanner 20 about the target object T substantially without restriction. The scanner 20, therefore, is preferably a hand-held, free-motion scanner.

The imaging system 10 also has a position reference field emitter 40, a first spatial position sensor 50($a$) attached to the scanner 20 that detects the position of the scanner 20 in the reference field, and a second spatial position sensor 50($b$) attached to the target object T that detects the position of the target object T in the reference field. The reference field emitter 40 and at least one of the position sensors 50($a$) and 50($b$) define a spatial detector or a tracking system. The emitter 40 preferably has three electromagnetic coils 42, 44 and 46 enclosed in a plastic shell 48 and positioned with respect to one another along orthogonal axes 43, 45, and 47, respectively. The sensors 50($a$) and 50($b$) each have three electromagnetic coils (not shown) arranged along orthogonal axes and enclosed in a small plastic shell similar to the reference field emitter 40. In a preferred embodiment, the first sensor 50($a$) is attached to the scanner 20 in the cavity 26, and the second sensor 50($b$) is secured to the target object T by a strap 52.

To track the positions of the scanner 20 and the target object T, the reference field emitter 40 emits three magnetic fields that are detected by the electromagnetic coils in each of the sensors 50($a$) and 50($b$). As the scanner 20 and target object T move, the sensors 50($a$) and 50($b$) each generate signals corresponding to real-time measurements of location (X, Y, and Z Cartesian coordinates) and orientation (azimuth, elevation, and roll) with respect to the position reference field generated by the emitter 40. Accordingly, the first sensor 50($a$) provides real-time position and orientation measurements of the scanner 20, and the second sensor 50($b$) provides real-time position and orientation measurements of the target object T. The reference field emitter 40 and each of the first and second position sensors 50($a$) and 50($b$) are operatively coupled to hardware and software in a host computer 70 that processes the signals and computes the positions of the first and second sensors 50($a$) and 50($b$). Suitable position tracking systems are manufactured by Polhemus Incorporated, of Colchester, Vt.

The imaging system 10 also has a noncontact distance measuring device 60 attached to the scanner 20 to measure the distance between the surface of the target object T and the scanner 20. The noncontact distance measuring device 60 is preferably a laser distance measuring device with an emitter 61 that directs a laser beam 62 towards the target object T, and a sensor 63 that detects a reflected beam from the target object T. The noncontact distance measuring device 60 is preferably mounted in the cavity 26 of the scanner 20 to align the beam 62 with the opening (not shown) of the cavity 26 or with an aperture (not shown) through the cover 28 on the scanner 20. A suitable laser distance sensor 60 for use in the imaging system 10 is the ANL1651RAC laser distance sensor manufactured by Aromat Corporation.

To scan the target object T with the scanner 20, the operator presses a switch (not shown) on the handle 24 that activates the laser beam 62 and moves the laser beam 62 over the surface of the target object T. The operator preferably scans the target object T by moving the beam 62 along a back-and-forth path S over the target object T. As the laser beam 62 scans the target object T, a reflected portion of the beam 62 changes corresponding to the distance between the target object T and the scanner 20. It will be appreciated that the laser beam 62 does not mechanically contact the target object T, and thus the noncontact distance measuring device does not deflect the skin or other deformable surface of a target object T. Other noncontact distance measuring devices 60, such as non-laser light distance sensors, acoustic sensors or magnetic measuring devices, may be used to measure the distance between the target object T and the scanner 20 without mechanically contacting the target object.

Still referring to FIG. 1, the reference field emitter 40, the position sensors 50(*a*) and 50(*b*), and the noncontact distance measuring device 60 are operatively coupled to the host computer 70. In a preferred embodiment, signals are transmitted via conductive lines 73 between the host computer 70 and the emitter 40, the position sensors 50(*a*) and 50(*b*), and the noncontact distance measuring device 60. As discussed in greater detail below, the host computer 70 has a processor that uses the signals from the emitter 40, the sensors 50(*a*) and 50(*b*), and the noncontact distance measuring device 60 to generate an accurate three-dimensional image of the target object T.

Figure 2:
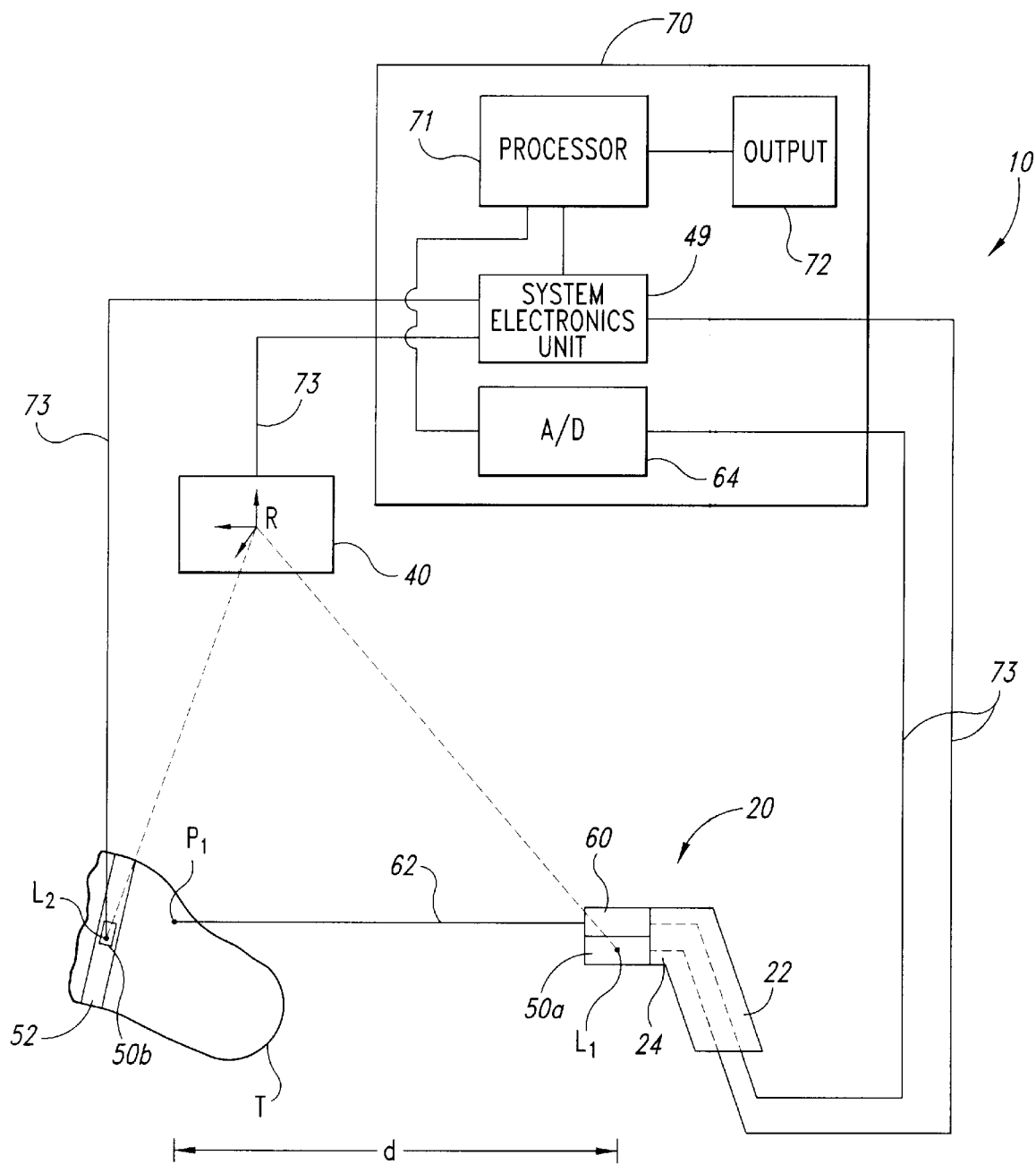
FIG. 2 is a block diagram of an embodiment of an imaging system in accordance with the invention.

FIG. 2 is a block diagram that illustrates an embodiment of the operation of the imaging system 10. To generate a three-dimensional image of the target object T, the imaging system 10 detects the location of surface points on the target object T by measuring: (1) the position $L_1$ and orientation of the scanner 20; (2) the position $L_2$ and orientation of the target object T; and (3) the distance "d" between a point $P_1$ on the surface of the target object T and the scanner 20. As discussed above, the emitter 40 emits a reference field R along three orthogonal axes, and each of the position sensors 50(*a*) and 50(*b*) has three orthogonal magnetic coils that generate position signals denoting the location and orientation of the position sensors 50(*a*) and 50(*b*) within the position reference field R. The position signals from the position sensors 50(*a*) and 50(*b*) are transmitted to a position tracking system electronics unit 49, which is housed in the host computer 70 and operatively coupled to a processor 71 of the host computer 70. The position tracking system electronics unit 49 generates digital signals denoting the positions and orientations of the position sensors 50(*a*) and 50(*b*). The position system electronics unit 49 then sends the digital position and orientation signals of the first and second position sensors 50(*a*) and 50(*b*) to the processor 71 of the host computer 70. Accordingly, the position $L_1$ and orientation of the scanner 20 and the position $L_2$ and orientation of the target object T are denoted throughout the imaging process as the surface of the target object is scanned. A suitable position system electronics unit 49 is a component part of the FASTRAK and ULTRATRAK position tracking systems manufactured by Polhemus Incorporated.

As the position tracking system denotes the positions and orientations of the scanner 20 and the target object T, the noncontact distance measuring device 60 measures the distance between the surface of the target object T and the scanner 20. The noncontact distance measuring device 60 preferably measures the distance from the target object T to the scanner 20 at the same time as the position tracking system denotes the positions and orientations of the target object T and the scanner 20. The noncontact distance measuring device 60 sends analog signals corresponding to the distance "d" to an analog/digital converter 64, which digitizes the signals from the noncontact distance measuring device 60 and sends the digitized signals to the processor 71. Suitable analog/digital converters are well known in the art, and thus a suitable A/D converter may be selected according to the operating parameters of the particular noncontact distance measuring device 60.

Still referring to FIG. 2, the processor 71 of the host computer 70 processes the position, orientation and distance measurements to generate surface point measurements of the surface of the target object T. For example, to generate a surface point measurement of the point $P_1$, the computer 70 initially generates a preliminary point measurement by summing the position $L_1$ and orientation of the scanner 20 and the distance d between the scanner 20 and the point $P_1$. The computer 70 then correlates the preliminary point measurement with the position $L_2$ and orientation of the target object T to generate a virtual surface point measurement of the surface point $P_1$ on the surface of the target object T. Although all of the measurements are preferably made and processed in real time, they may be made and processed at different times as long as the times at which the individual measurements were taken are recorded along with the corresponding measurements. The respective times of the measurements of the positions and orientations of the scanner 20 and the target object T and the distances d between the scanner 20 and the point $P_1$ can subsequently be used to correlate these measurements to each other during processing. In the operation of either case, the beam 62 of the distance measuring device 60 is scanned over the surface of the target object T (as shown in FIG. 1) to generate a plurality of surface point measurements of the target object T. The surface point measurements are then preferably used to generate a three-dimensional image of the target object T that is displayed on an output device 72, such as a monitor or printer. The surface point measurements may also be used for other purposes. For example, the surface point data could be used to control a numerical control milling machine to fabricate a prosthetic device matching the shape of a limb.

Figure 3:
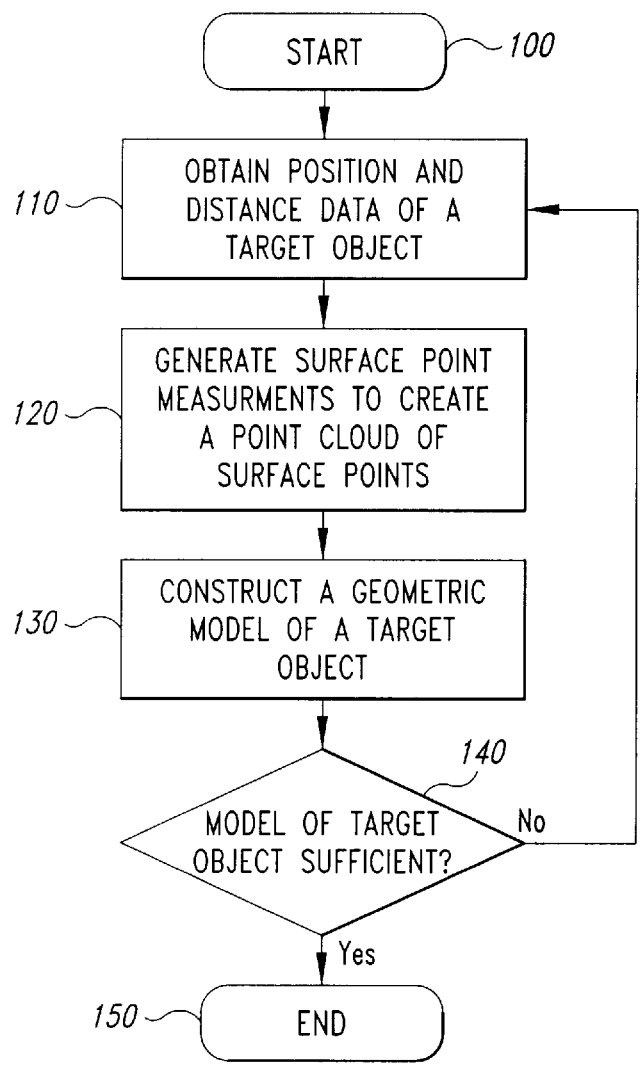
FIG. 3 is a flow chart of an embodiment of an operating process and software executed by a processor in the imaging system of FIG. 1 to control the operation of the imaging system.

FIG. 3 is a flow chart illustrating an embodiment of an operating process and software executed by the host computer 70 to generate a model of the surface of the target object T from the plurality of surface point measurements. At start-up 100, the non-contact distance measuring device 60 and the tracking system may be calibrated to ensure that the position and distance measurements obtained by scanning the target object T will be accurate. After start-up 100, an operator freely moves the scanner 20 in a data acquisition step 110 to scan the non-contact distance measuring device 60 over the target object T and thus obtain position and data measurements of the surface of the target object. The operator may randomly scan the distance measuring device 60 over the target object, but it is generally more desirable to scan the distance measuring device 60 in a relatively uniform pattern with respect to the target object T, as described above.

During the data acquisition step 110, the host computer 70 may perform a computation step 120 in which the host computer 70 computes surface point measurements to create a point cloud of surface points representative of the target object T. The host computer 70 generally computes and displays the surface point measurements in real-time so that the operator can see the density of the point cloud and stop the data acquisition step 110 when the point cloud appears to have enough surface points to construct a model of the target object T. Once the point cloud appears to be sufficient to generate an accurate model of the target object T, the host computer 70 performs a modeling step 130 in which the surface point measurements of the point cloud are assigned a surface representation to construct a geometric model of the target object. Suitable software for performing the modeling step 130 is the Geomagic Wrap™ manufactured by Raindrop Geomagic, Inc., of Champaign, Ill.

After the modeling step 130, the operator and/or the host computer 70 evaluate the model of the target object in step 140 to determine whether the model of the target object T is accurate. In general, the operator may visually compare the display of the model on a computer monitor with the actual surface of the target object T to determine whether enough position and distance data was obtained to accurately represent the target object T. If the operator determines that the model of the target object is insufficient, then the operator returns to the data acquisition step 110 to scan more position and distance data into the host computer 70. The host computer 70 accordingly re-performs the computation step 120 to add more surface points to the point cloud, and the host computer 70 also re-performs the modeling step 130 with the new point cloud to reconstruct another model of the target object T. On the other hand, if the operator determines that the model of the target object T is sufficient, then the operator simply terminates the digitizing process at step 150.

Figure 4:
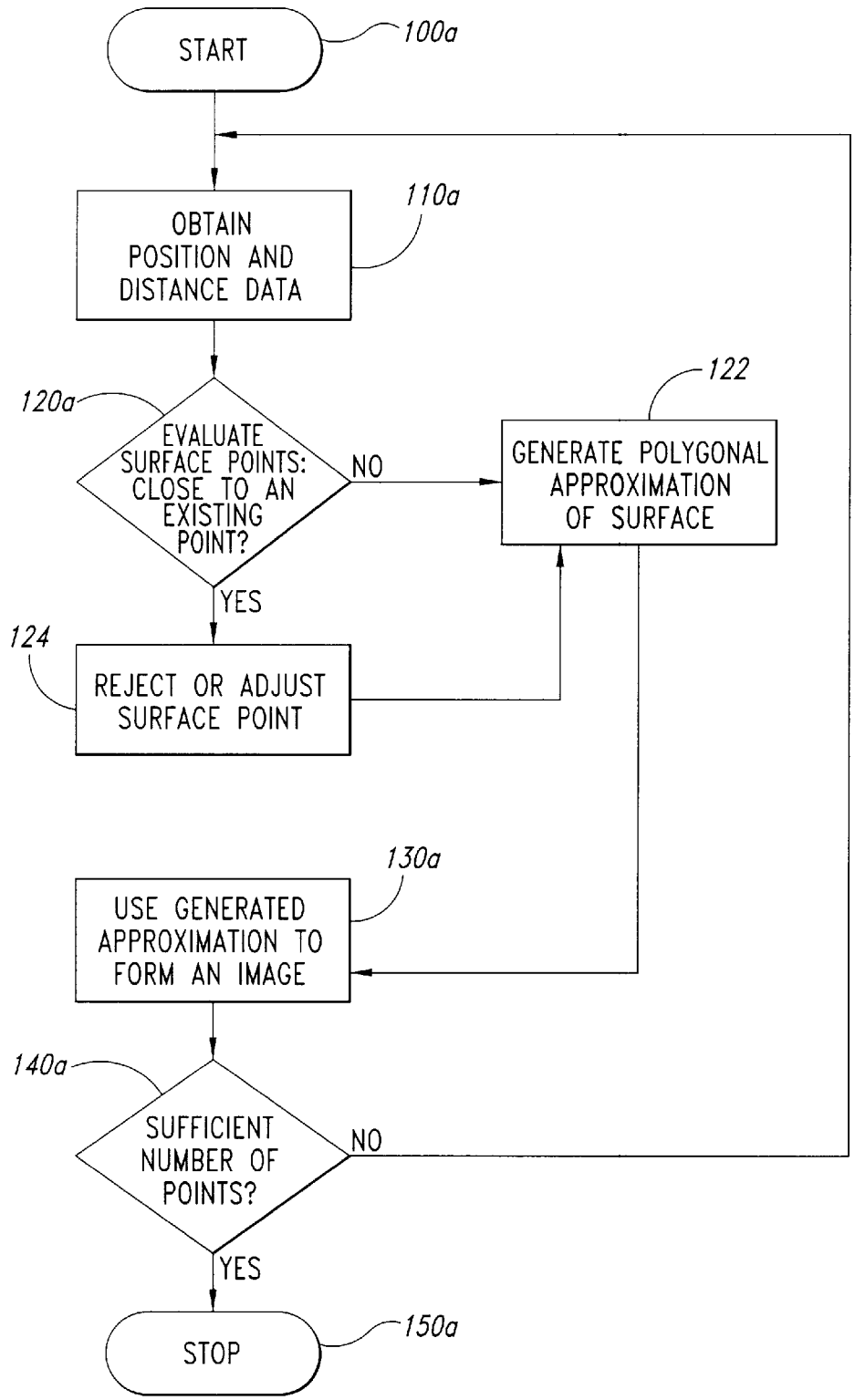
FIG. 4 is a flow chart of another embodiment of an operating process and software executed by a processor in the imaging system of FIG. 1 to control the operation of the imaging system.

FIG. 4 is a flow chart illustrating another embodiment of a process and software to generate an approximation of the surface of the target object T from the plurality of surface point measurements. At start-up 100(a), the imaging system 10 is calibrated to confirm the accuracy of the noncontact distance measuring device 60 by measuring a known distance between the scanner 20 and a reference object. After start-up 100(a), a data measuring step 110(a) occurs in which position and distance data is recorded as the operator freely moves the scanner 20 to scan the noncontact distance measuring device 60 over the target object T. As discussed above with respect to FIG. 2, the host computer 70 generates surface point measurements from the position and distance data generated by the scanner 20 and the position tracking system.

During the data measuring step 110(a), the host computer 70 may also perform an evaluation routine 120(a) in which surface point measurements are compared to each other to determine whether a first surface point is within a predetermined distance of a second surface point. The predetermined distance is set by the operator to adjust the resolution of the imaging system 10, and it is preferably between 0.1 and 5.0 mm. If the first surface point is not within the predetermined distance of the second surface point, the processor 71 proceeds to step 122 in which the first and second surface points are preferably used with at least one other previously evaluated surface point to generate a polygonal approximation of a portion of the surface of the target object. On the other hand, if the first surface point is within the predetermined distance of the second surface point, the processor 71 proceeds to step 124 in which it either rejects the second surface point or adjusts the first and second surface points to generate a single weighted surface point. The single surface point from step 124 is then used to regenerate a polygonal approximation of a portion of the target object T in step 122.

Figure 5:
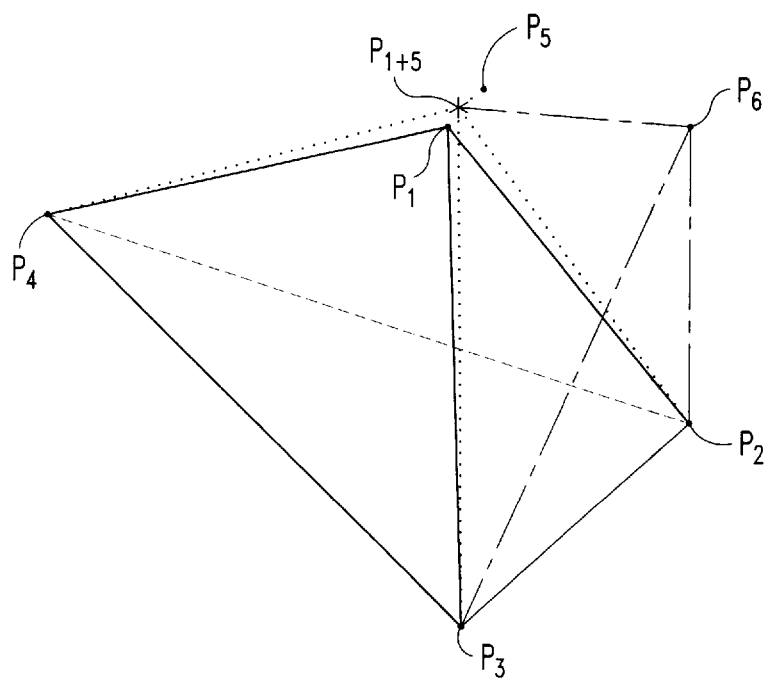
FIG. 5 is an isometric view of exemplary surface point measurements used in the operation of an embodiment of an imaging system in accordance with the invention.

To generate an image of the target object T from the polygonal approximations of portions of the target object T, the processor 71 performs a shaping routine 130(a) in which it connects the polygonal approximations and forms a three-dimensional image of the target object T. FIG. 5 is a schematic diagram that further illustrates an embodiment of the evaluation routine 120(a) and the shaping routine 130(a). For purposes of example, the processor 71 (shown in FIG. 2) calculates a number of surface point measurements $P_1$–$P_5$ as discussed above with respect to FIG. 2. In this example, the points $P_1$–$P_4$ are a sufficient distance from one another to fall outside of the predetermined range in the evaluation routine 120(a) of FIG. 4, and thus the computer 70 generates triangular surface approximations between points $P_1$–$P_4$ in a tetrahedron ($P_1$, $P_2$, $P_3$, $P_4$—shown in solid lines) according to step 122 of FIG. 4. The processor 71 then proceeds to evaluate point $P_5$, which is within the predetermined distance of $P_1$. In this example, the processor 71 adjusts points $P_1$ and $P_5$ to form a new point $P_{1+5}$ according to step 124 of FIG. 4, and then it generates another set of triangular surface approximations between points $P_{1+5}$–$P_4$ to form a slightly different tetrahedron ($P_{1+5}$, $P_2$, $P_3$, $P_4$—shown in dotted lines). Conversely, the processor 71 may reject point $P_5$ and keep the tetrahedron ($P_1$, $P_2$, $P_3$, $P_4$).

As more surface points are determined in the data measuring step 110(a) and evaluated in the evaluation routine 120(a), additional tetrahedrons are generated and existing tetrahedrons are continuously altered. For example, assuming another surface point P6 is processed next, a new tetrahedron ($P_{1+5}$, $P_2$, $P_3$, $P_6$—shown in dashed lines) is generated and correlated with the existing tetrahedron ($P_{1+5}$, $P_2$, $P_3$, $P_4$). In a preferred embodiment, suitable software packages for generating a three-dimensional image from the surface point calculations are the Alpha Shapes and the Geomagic Wrap™ digitizing software manufactured by Raindrop Geomagic, Inc., of Champaign, Ill. It will be appreciated, however, that different methods and software may be used to generate polygonal approximations of portions of the target object T.

Referring again to FIG. 4, the processor 71 executing the software of FIG. 4 proceeds to step 140(a) in which the processor 71, either with or without operator input, determines whether enough points were generated and evaluated to accurately form a three-dimensional image of the target object T. The operator may subjectively determine whether the three-dimensional image of the target object T is sufficient. Conversely, the processor 71 may analyze the number of points falling within the predetermined range of the evaluation routine 120(a), and then proceed according to whether the percentage of rejected/adjusted points exceeds a predetermined value. If the percentage of rejected/adjusted points is below the predetermined value, the processor 71 returns to step 110(a) in which it obtains additional position, orientation and distance information to calculate additional measurements of surface points. On the other hand, if the percentage of rejected/adjusted points exceeds the predetermined value, the processor 71 proceeds to step 150(a) in which it terminates the digitizing process.

The preferred embodiment of the present invention has several advantages over existing digitizing systems. One advantage of the preferred embodiment of the invention is that it measures the shape of the target object without mechanically contacting the surface of the target object. Unlike many conventional devices that contact the surface of the target object with a probe, the preferred embodiment of the present invention scans the surface of the target object with a noncontact distance measuring device. The preferred embodiment of the invention, therefore, generates accurate images of the target object because it does not deflect or otherwise alter the surface of the target object.

Another advantage of the preferred embodiment of the invention is that the noncontact distance measuring device and the target object can move freely during the digitizing process. Because the position and orientation of the scanner is detected in three-dimensional space by magnetic sensors, the imaging system of the invention is preferably operated from a hand-held, free-motion scanner that may be moved manually in a substantially unrestricted manner about the target object. Similarly, because the position and orientation of the target object is detected by another sensor, the target object itself may move while it is scanned. Thus, the preferred embodiment of the invention is convenient for digitizing large objects or anatomical features.

Figure 6:
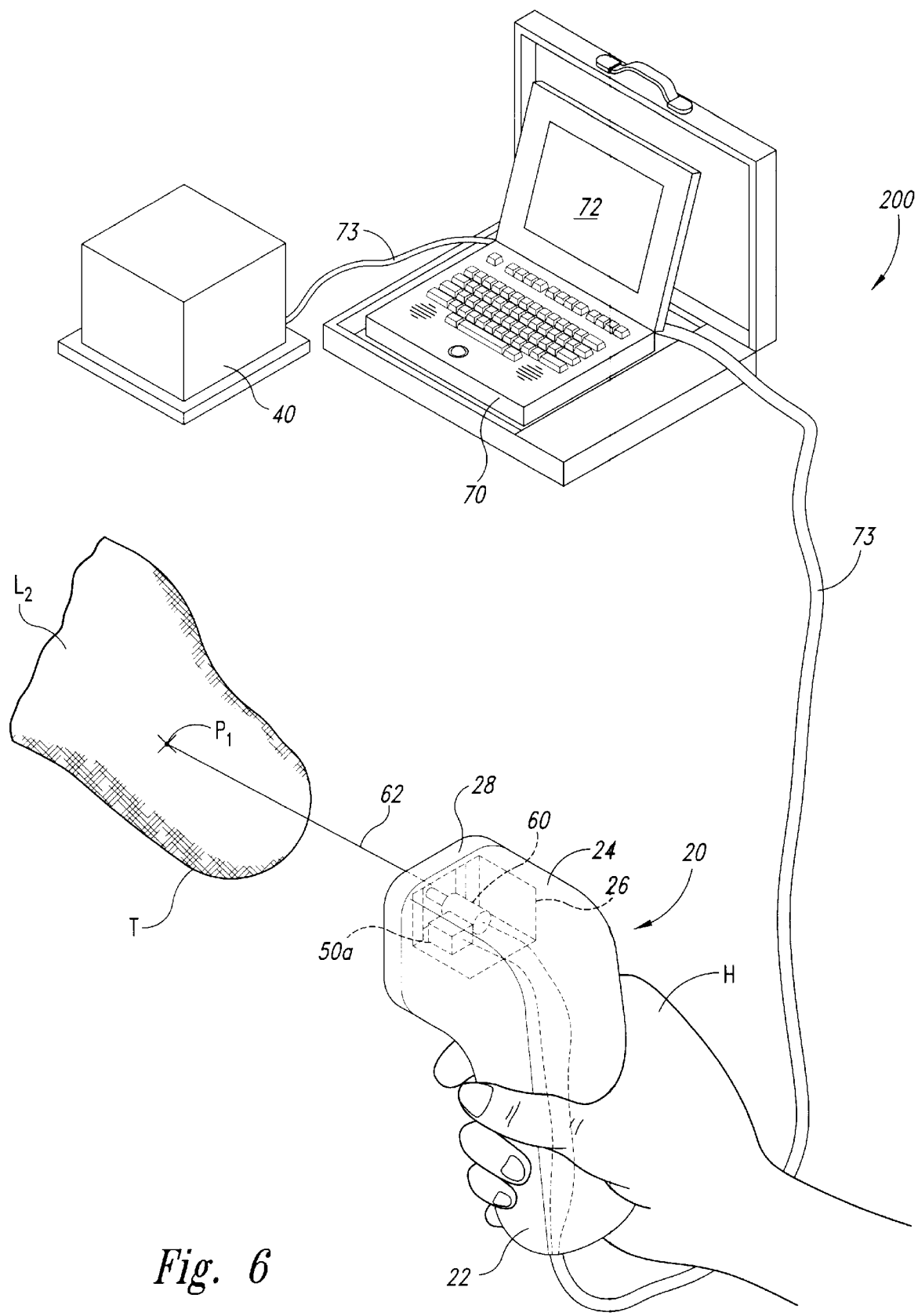
FIG. 6 is an isometric view of another embodiment of an imaging system in accordance with the invention.

FIG. 6 is an isometric view of another embodiment of an imaging system 200 in accordance with the invention. The imaging system 200 is substantially the same as the imaging system 10 discussed above with respect to FIGS. 1–5, except that a second position sensor is not attached to the target object T. The target object T, accordingly, is preferably stationary when the operator scans the beam 62 of the noncontact distance measuring device 60 over the surface of the target object T. Since the position $L_2$ and orientation of the target object T remains constant, only the position and orientation of the scanner 20 and the distance between the scanner 20 and the target object T need to be measured and processed to generate a three-dimensional image of the target object T. The imaging system 200 otherwise operates in substantially the same manner as the imaging system 10 to generate an accurate three-dimensional image of the target object T.

The imaging system 200 is particularly usefull for generating three-dimensional images of inanimate objects. Compared to the imaging system 10, one advantage of an embodiment of the imaging system 200 is that it requires less equipment and it generally generates a three-dimensional image faster because it processes less data. A disadvantage of an embodiment of the imaging system 200, however, is that the target object T should not move while the operator scans the surface of the target object T.

Figure 7:
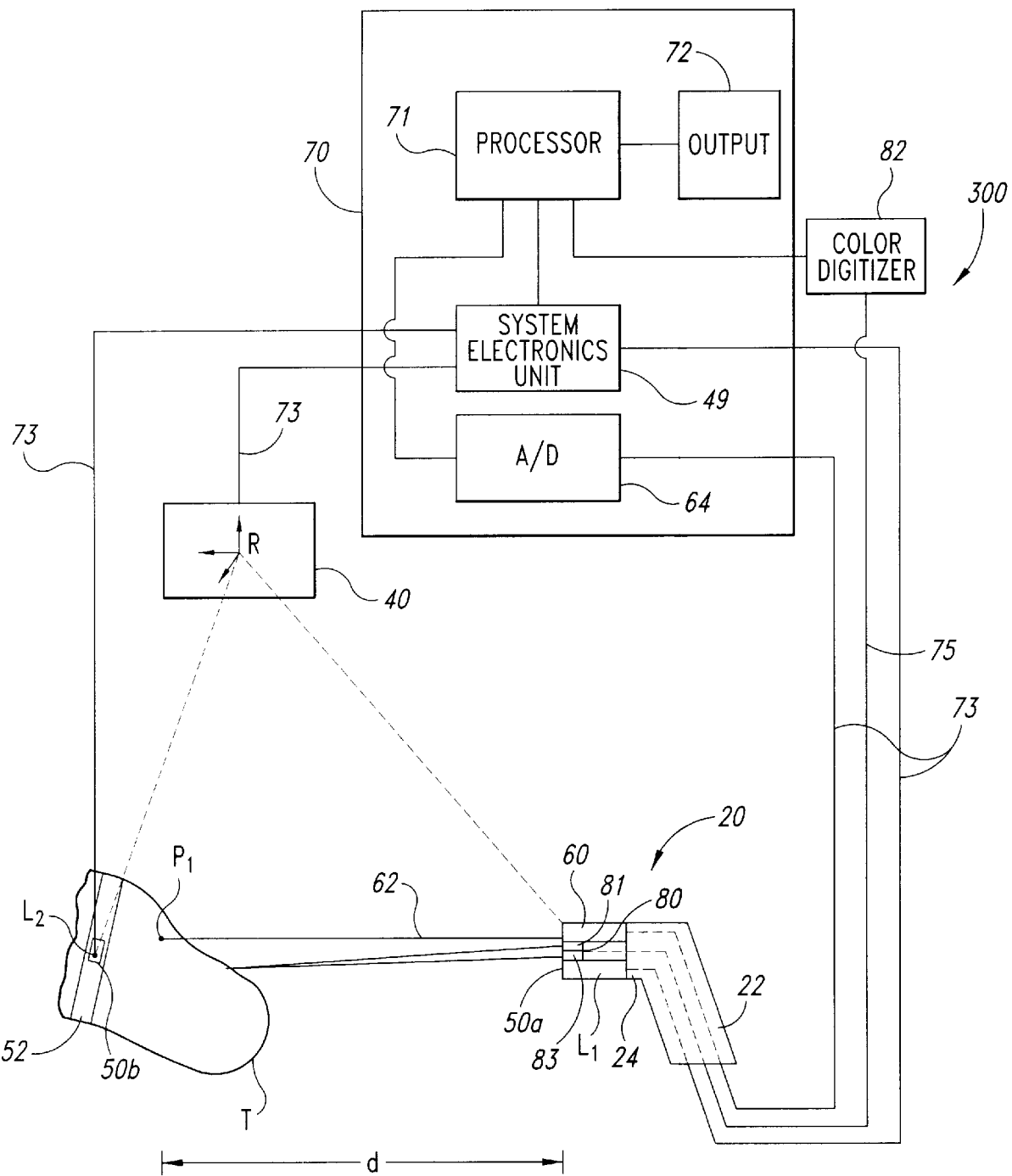
FIG. 7 is a block diagram of another imaging system in accordance with the invention.

FIG. 7 is a block diagram of another embodiment of an imaging system 300 in accordance with the invention for producing color three-dimensional images of the target object T. In addition to the components discussed above with respect to the imaging system 10 (shown in FIGS. 1–5), the imaging system 300 also has an optical color sensor 80 to detect the color of the points on the target object T scanned by the beam 62. The optical color sensor 80 is preferably a digital device with a separate light source 81 that emits white light and a detector 83 that detects the color of light reflected from the target object T. The color images from the detector are transmitted via a fiber optical line 75 to an optical digitizer 84. The host computer 70 receives the digitized output from the optical digitizer 84 and correlates the calculated surface points on the target object T with the detected color of the surface points. A suitable digital color sensing system is the Miniscan manufactured by Hunter Associates Laboratories, Inc. of Reston, Va.

Figure 8:
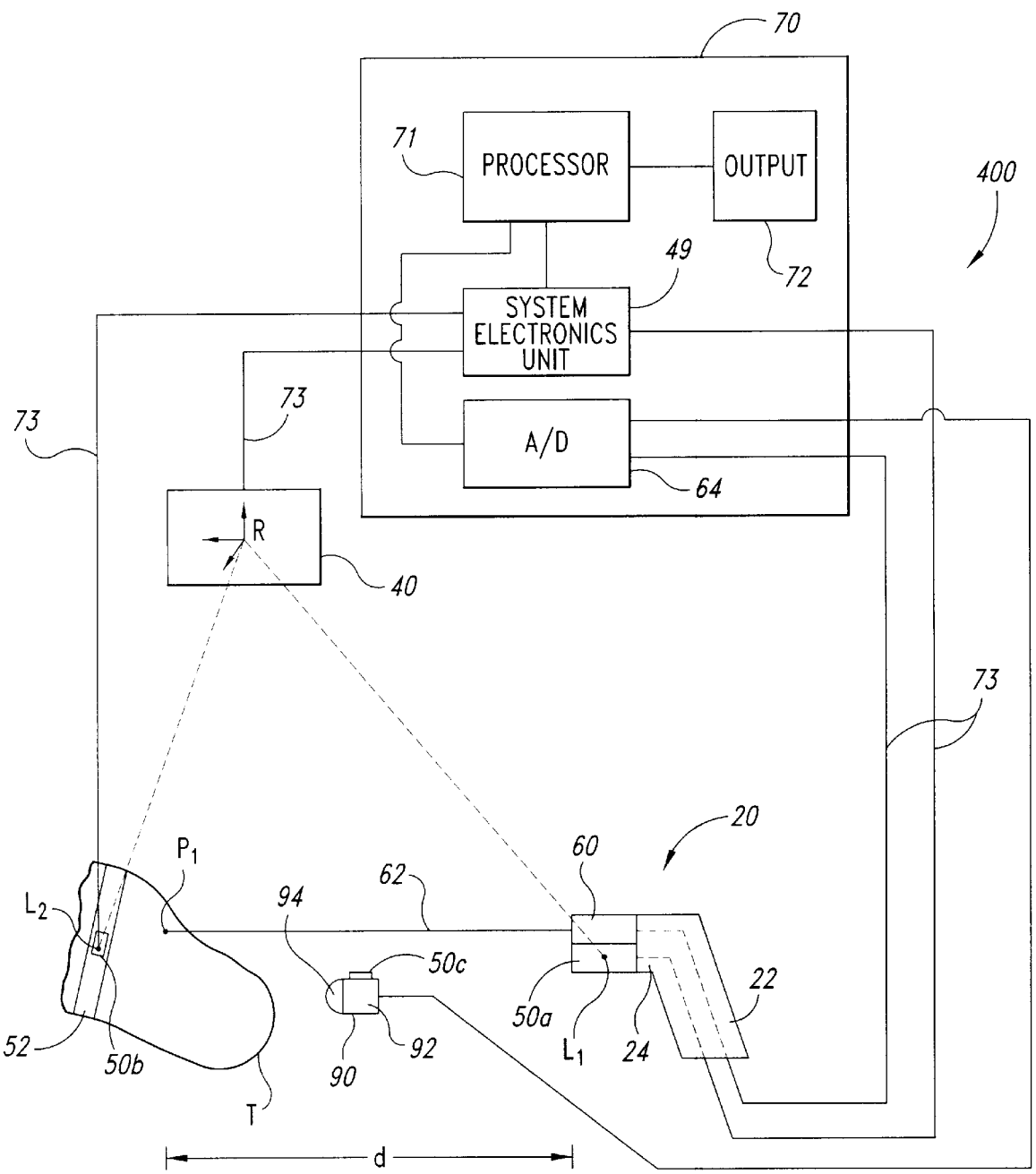
FIG. 8 is a block diagram of another imaging system in accordance with the invention.

FIG. 8 is a block diagram of another embodiment of an imaging system 400 in accordance with the invention for producing three-dimensional images of the target object T that further illustrate the hardness of the target object T. In addition to the components described above with respect to the imaging system 10, the imaging system 400 also has a hand-held pressure sensing device 90 to detect the pressure necessary to deflect selected areas of the surface of the target object T. The pressure sensing device 90 preferably has a thimble-like housing 92 adapted to fit over the end of a finger of an operator (not shown), a pressure sensor 94 attached to the tip of the housing 92, and a third position sensor 50(c) attached to the housing 92. The pressure sensor 94 is operatively coupled to the computer 70, and the third positional sensor 50(c) is operatively coupled to the computer 70 via the position system electronics unit 49. As described above with respect to FIG. 2, the third position sensor 50(c) detects the position and orientation of the pressure sensing device 90 with respect to the reference field R emitted by the emitter 40. Additionally, when the pressure sensing device 90 presses against the surface of the target object T, the pressure sensor 94 generates a signal corresponding to the pressure between the target object T and the pressure sensor 94.

The pressure sensing device 90 is particularly useful to determine the compressibility of human tissue. In medical applications, for example, a practitioner may press an injured area to diagnose the condition of the tissue at the injured area to avoid making casts or prosthetics that press against sensitive areas. By sensing the pressure necessary to deflect the tissue at an injured area, the imaging system 400 provides a graphical indication of the condition of the tissue.

The imaging system 400 generates a three-dimensional image of the target object T in substantially the same manner discussed above with respect to the imaging system 10. Once the three-dimensional image of the target object T is generated, the imaging system 400 further correlates pressure and location measurements of the pressure sensing device 90 with the surface point measurements of the three-dimensional image of the target object T. The pressure measurements are preferably superimposed on the three-dimensional image of the target object T with a color code representing the pressure and corresponding deflection of the surface of the target object T. An advantage of the embodiment of the imaging system 400 is that tissue structure and other information may be incorporated into the three-dimensional image of the target object T to enhance the manufacturing and use of prosthetics and other medical devices.

Figure 9:
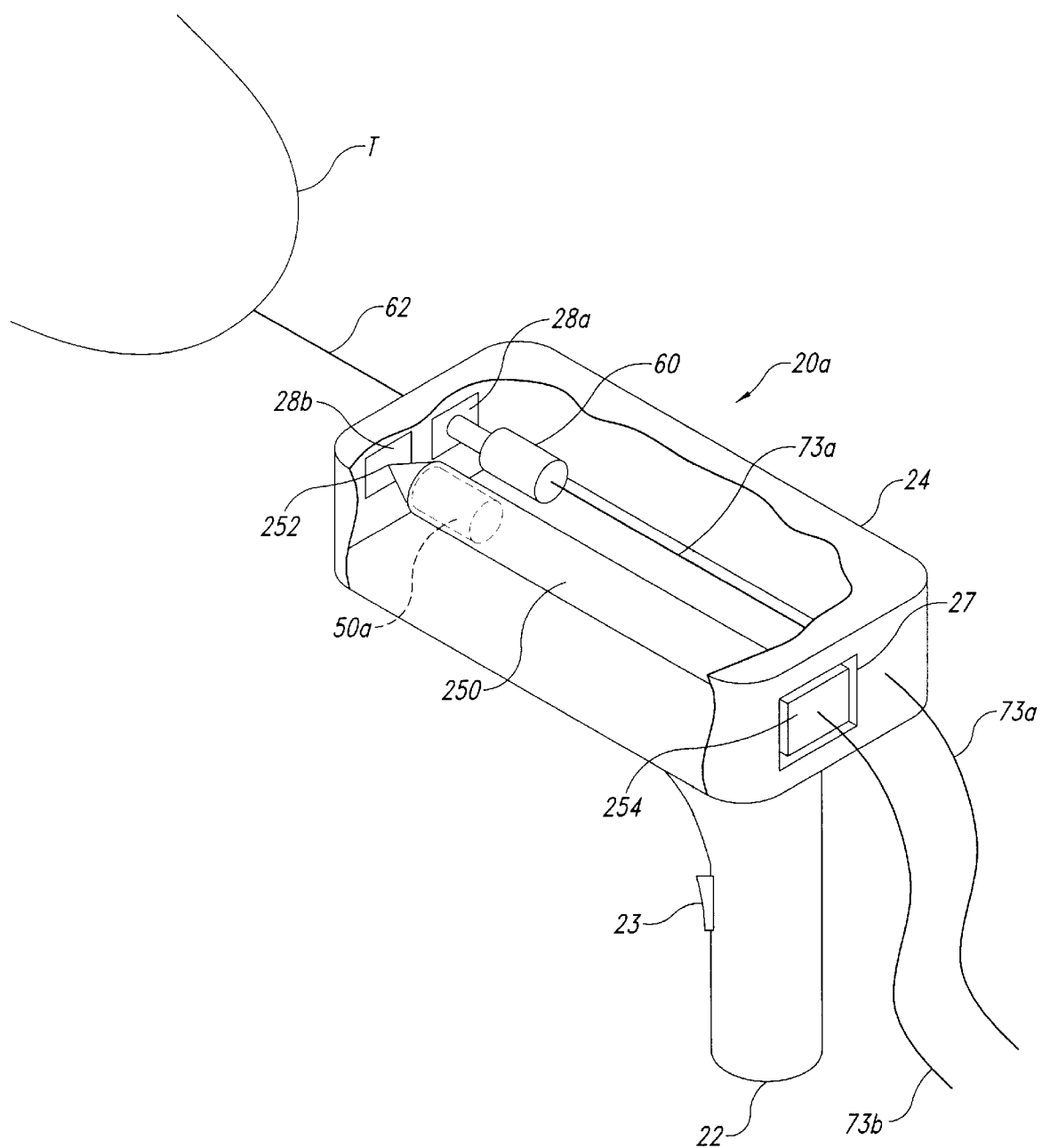
FIG. 9 is an isometric view of an embodiment of another scanner used in an imaging system in accordance with the invention.
Figure 10:
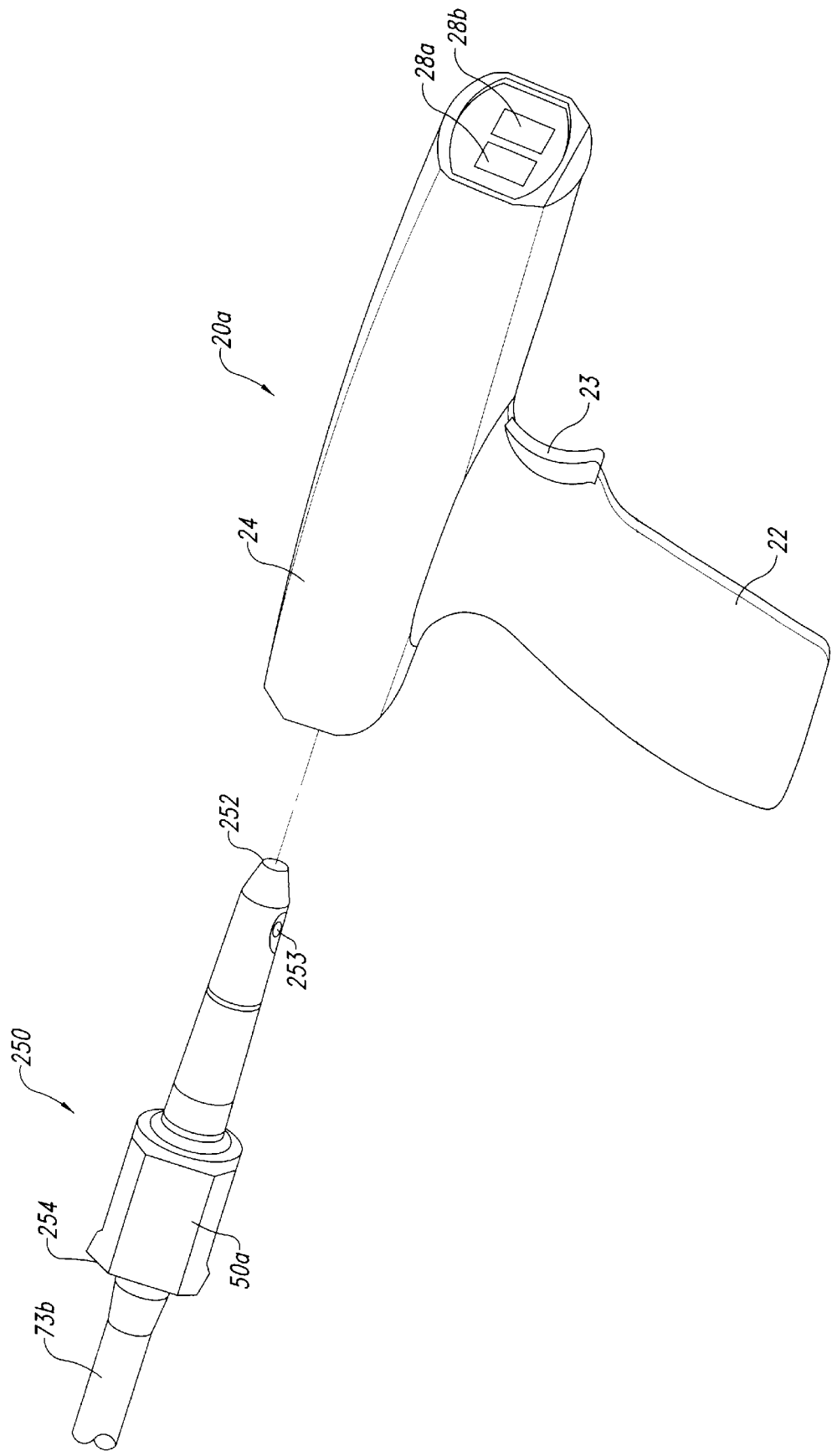
FIG. 10 is another isometric view of the scanner of FIG. 9.
Figure 11:
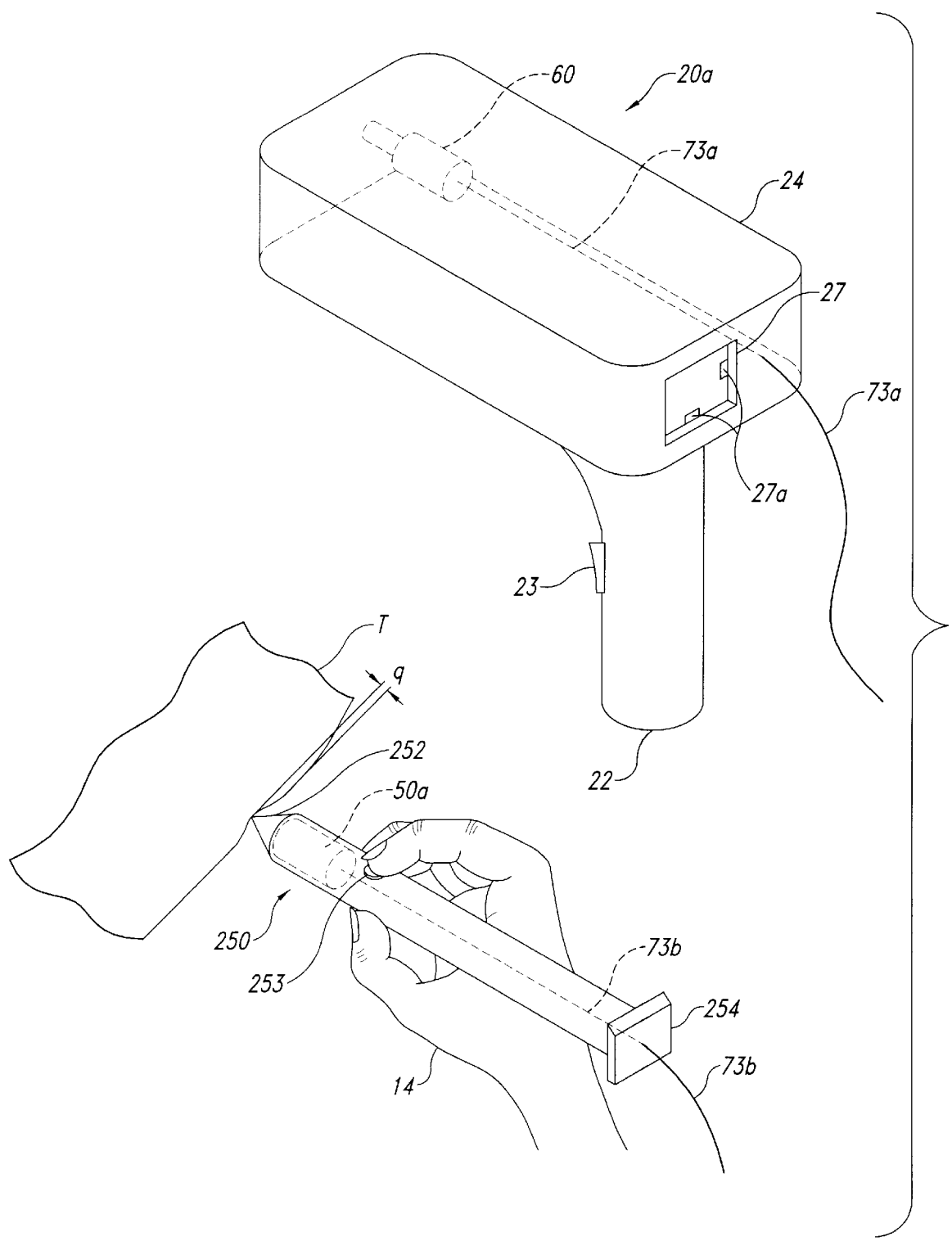
FIG. 11 is an isometric view of an embodiment of the operation of the scanner of FIGS. 9 and 10.

FIGS. 9–11 are isometric views of an embodiment of another hand-held scanner 20(a) for scanning the target object T and/or providing deflection measurements of the surface of the target object T. As discussed above with respect to the hand-held scanner 20 of FIG. 1, the hand-held scanner 20(a) has a handle 22 and a pointer section 24 in which a noncontact distance measuring device 60 is positioned. The handle 22 may have a trigger 23 to activate the noncontact distance measuring device 60 and obtain data on the distance between the hand-held scanner 20(a) and the target object T. Unlike the scanner 20 of FIG. 1, however, the first spatial position sensor 50(a) is positioned in a stylus 250 that is removably positioned in the pointer section 24 through an opening 27. The non-contact distance measuring device 60 and the stylus 250 are generally positioned in the pointer section 24 in alignment with covers 28a and 28(b), respectively. As best shown in FIG. 9, the removable stylus 250 may be attached to the scanner 20(a) so that the position sensor 50(a) detects the position and orientation of the scanner 20(a) in the manner discussed above. Thus, when the stylus 250 is positioned in the pointer section 24, the scanner 20(a) is used to scan the surface of the target object T and generate surface point measurements.

As shown in FIGS. 10 and 11, on the other hand, the stylus 250 may be removed from the pointer section 24 to mark and/or sense the deformation of the surface of the target object T (FIG. 11). The stylus 250 generally has a tip 252, a switch 253, and a base 254. When the stylus 250 is removed from the pointer section 24, the switch 253 activates the first position sensor 50(a) to determine the position of the stylus 250 with respect to the reference field emitter 40 (shown in FIG. 1). The first position sensor 50(a) may be positioned in the base 254 (FIG. 10) or towards the tip 252 (FIGS. 9 and 11) of the stylus 250. Additionally, the base 254 of the stylus 250 may be adapted to engage stop surfaces 27(a) projecting inwardly into the hole 27 to accurately position the stylus 250 in the pointer section 24. The noncontact distance measuring device 60 and the first distance sensor 50(a) may be coupled to the host computer 70 with separate lines 73(a) and 73(b), respectively, to allow the stylus 250 to be easily manipulated separately from the pointer section 24.

FIG. 11 best illustrates the operation of the scanner 20(a) in marking or measuring the deformation of the surface of the target object T. Once the stylus 250 is removed from the pointer 24, the switch 253 or a sensor (not shown) signals the host computer 70 that the digitizer is in a deformation/marking mode instead of a scanning mode. To mark the surface of the target object T, the operator depresses the switch 253 and moves the tip 252 of the stylus 250 across the surface of the target object T without deflecting the surface of the target object T. To measure the deformation of the surface of the target object T, the operator depresses the switch 253 and presses the tip 252 against the surface of the target object T with a desired force so that the surface of the target object T deflects by a distance q. In the manufacturing of prosthetic devices, the removable stylus 250 is particularly useful for marking certain areas on a patient's limb and determining the shape of a prosthetic device. Therefore, the scanner 20(a) may be used to determine the compressibility of human tissue in a manner similar to that of the imaging system 400 of FIG. 8.

An advantage of an embodiment of the scanner 20(a) with a removable stylus 250 is that it allows a practitioner to make changes to the model generated by the scanning process of the digitizer based upon the practitioner's tactile skills via manipulation of the target object. For example, a prosthetist may press the stylus 250 against a patient's leg stub according to the prosthetist's sense of touch and experience in making prosthetic devices. As a result, the stylus 250 may measure the prosthetist's tactile manipulation of the actual surface of the leg stub to change the model of the leg stub. Thus, a prosthetic device specifically manufactured to fit the patient's leg stub is likely to be more comfortable and perform better.

Figure 12:
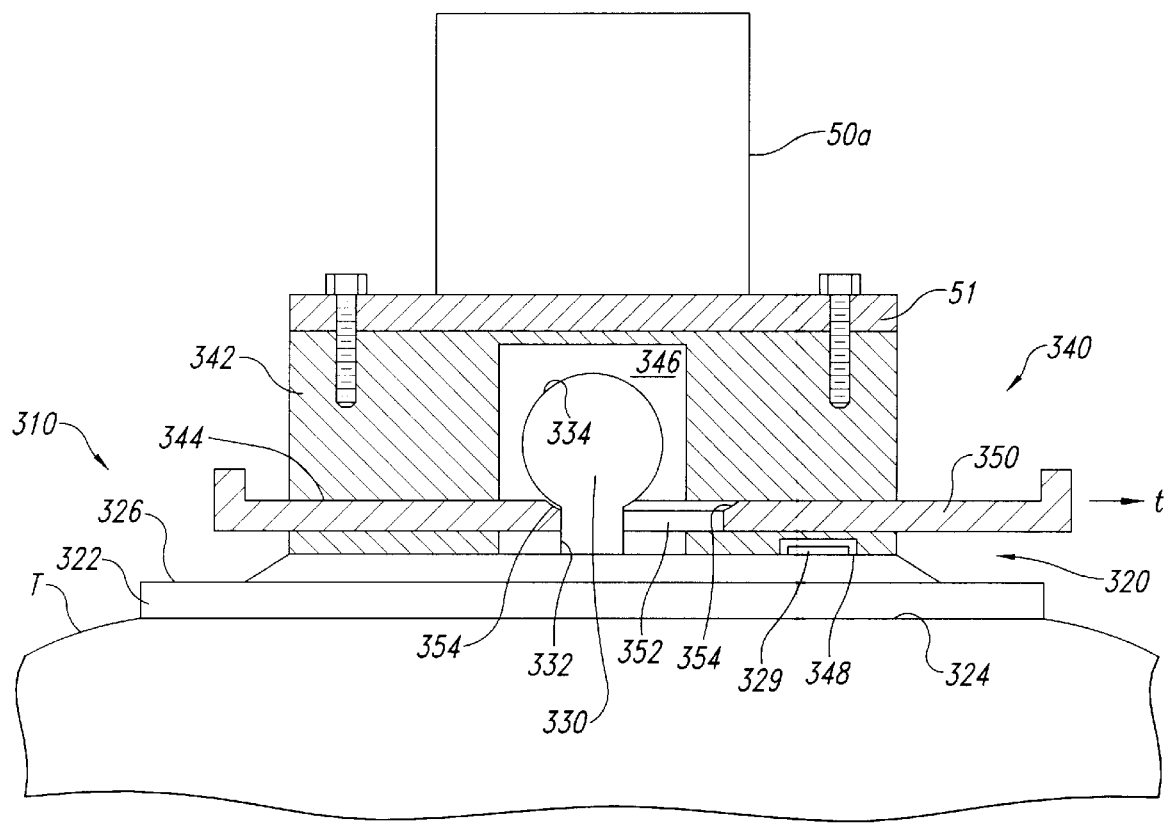
FIG. 12 is a cross-sectional view of an embodiment of an attachment element for attaching a position sensor to a target object in the operation of an imaging system in accordance with the invention.

FIG. 12 is a cross-sectional view of an embodiment of an attachment element 310 for securely attaching the second position sensor 50(b) to the surface of the target object T. The attachment element 310 may have a base 320 that may be affixed to the surface of the target object T, and the attachment element 310 may have a coupler 340 to couple the second position sensor 50(b) to the base 320. The base 320 may have an adhesive member 322 with an adhesive side 324 for securely attaching the adhesive member 322 to the target object T. The base 320 may also have a mounting plate 328 with a key 329, and a post 330 projecting upwardly from the mounting plate 328. The post 330 preferably has a neck 332 attached to the mounting plate 328 and a head 334 projecting upwardly from the neck 332. The adhesive member 322 is generally made from a soft, resilient material, and the mounting plate 328 and the post 330 are generally made from relatively rigid material.

In the embodiment of the attachment element 310 shown in FIG. 12, the coupler 340 has a body 342 with a transverse slot 344, a vertical cavity 346 configured to receive the head 334 of the post 330, and a recess 348 configured to receive the key 329 of the mounting plate 328. The coupler 340 also has a lock-plate 350 with a hole 352 configured to align with the cavity 346 when the lock-plate 350 is centered with respect to the base 342 (not shown). In operation, the lock-plate 350 is initially centered so that the hole 352 aligns with the cavity 346, and then the post 330 is positioned in the cavity 346. The lock-plate 350 is moved transversely (indicated by arrow t) to engage a beveled edge 354 of the hole 352 with the head 334 of the post 330. The beveled edge 354 accordingly draws the body 342 against the mounting plate 328. The coupler 340 is also positioned on the mounting plate 328 so that the key 329 of the mounting plate 328 is positioned in the recess 348 on the bottom of the body 342 to prevent the coupler 340 from rotating with respect to the base 320. To remove the coupler 340 from the base 320, the lock plate 350 is moved in the opposite direction until the hole 352 is aligned with the cavity 346.

An advantage of an embodiment of the attachment element 310 is that the surface of the target object T under the attachment element 310 may be determined by scanning the attachment element 310 itself. The attachment element 310 has a defined geometry, and thus the attachment element 310 can be scanned and then the data points of the attachment element 310 can be "erased" from the point cloud to model the surface of the target object T underlying the attachment element 310. Accordingly, the attachment element 310 does not hinder the process of obtaining distance and position data.

Another advantage of an embodiment of the attachment element 310 is that it securely attaches the second sensor 50(b) to the target object to inhibit the second sensor 50(b) from moving with respect to the target object during the digitizing process. Unlike the strap 52 illustrated in FIG. 1, the attachment element 310 may be securely attached to a target object by adhering the adhesive side 324 of the adhesive member 322 to the surface of the target object T and locking the coupler 340 to the base 320. The adhesive attachment between the target object T and the base 320 inhibits the base 320 from rotating or translating with respect to the target object T. Additionally, the fit between the key 329 and the recess 348 ensures that the coupler 340 does not move with respect to base 320 and the target object T. Accordingly, an embodiment of the attachment element 310 generally prevents the position sensor 50(b) from moving with respect to the target object T.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A device for obtaining data indicative of a surface of a target object, comprising:
   a freely movable scanner adapted to be moved freely about the target object by an operator;
   a noncontact distance measuring device attached to the scanner that measures distance between the scanner and a surface of the target object without mechanically contacting the target object;
   a spatial detector that detects the position and orientation of the noncontact distance measuring device with respect to a reference point;

a computer operatively coupled to the noncontact distance measuring device and the spatial detector, the computer correlating distance measurements from the noncontact distance measuring device with corresponding position and orientation measurements of the scanner from the spatial detector to calculate surface points of the target object; and an optical sensor attached to the scanner and operatively coupled to the computer to sense a color of the target object corresponding to a surface point of the target object.

2. The device of claim 1 wherein the noncontact distance measuring device is a laser distance measuring device.

3. The device of claim 1 wherein the noncontact distance measuring device is an acoustic distance measuring device.

4. The device of claim 1 wherein the spatial detector comprises an emitter that generates a position reference field and a first spatial sensor attached to the scanner that senses the position and orientation of the noncontact distance measuring device with respect to the position reference field.

5. The device of claim 4 wherein:

the emitter comprises a base magnet and the position reference field is a magnetic field emitted by the magnet; and the first spatial sensor is first magnet, wherein displacement between the base magnet and the first magnet produces an electrical signal indicating a position and orientation of the first magnet with respect to the base magnet.

6. The device of claim 4 wherein the scanner further comprises a stylus and the first spatial sensor is attached to the stylus, the stylus being removably attachable to a section of the scanner.

7. A device for obtaining data indicative of a surface of a target object, comprising:

a freely movable scanner adapted to be moved freely about the target object by an operator;

a noncontact distance measuring device attached to the scanner that measures distance between the scanner and a surface of the target object without mechanically contacting the target object;

a spatial detector that detects a position and an orientation of each of the noncontact distance measuring device and the target object with respect to a reference point, the spatial detector including an emitter that generates a position reference field, a first spatial sensor attached to the scanner that senses the position and orientation of the noncontact distance measuring device with respect to the position reference field, and a second spatial position sensor attached to the target object that detects the position and orientation of the target object in the position reference field; and a computer operatively coupled to the noncontact distance measuring device, the first spatial position sensor and the second spatial position sensor the computer correlating distance measurements from the noncontact distance measuring device with corresponding position and orientation measurements of the scanner and the target object from the first and second spatial position sensors, respectively, to calculate a plurality of surface point measurements of the target object and generate a three-dimensional image of the target object.

8. The device of claim 7 wherein the noncontact distance measuring device is a laser distance measuring device.

9. The device of claim 7 wherein:

the emitter comprises a base magnet and the position reference field is a magnetic field emitted by the magnet;

the first spatial sensor is first magnet, wherein displacement between the base magnet and the first magnet produces a first electrical signal indicating a position and orientation of the scanner with respect to the base magnet; and the second spatial sensor is a second magnet, wherein displacement between the base magnet and the second magnet produces a second electric signal indicating a position and orientation of the target object with respect to the base magnet.

10. The device of claim 7, further comprising an attachment element having a base and a coupler attached to the base, the base having an adhesive pad adapted to adhere to the target object and a post coupled to the adhesive pad, and the coupler having a body with a cavity to receive the post and a lock-plate to removably attach the body to the post, wherein the second spatial position sensor is attached to the coupler.

11. The device of claim 7 wherein the distance measuring device is a laser distance measuring device.

12. The device of claim 1 wherein the scanner comprises a pistolshaped member having a handle and a pointer, the distance measuring device being attached to the pointer.

13. The device of claim 12 wherein the distance measuring device is a laser distance measuring device that impinges a laser beam against the target object.

14. The device of claim 1 wherein the optical sensor is a video camera.

15. The device of claim 1, further comprising a pressure sensing device operatively coupled to the computer, the pressure sensing device measuring a pressure to deflect a local area on the surface of the target object.

16. The device of claim 15 wherein the pressure sensing device comprises a housing having a size and shape to attach to a finger of a human operator, and a pressure sensor attached to the housing and operatively coupled to the computer, the spatial detector detecting the position and orientation of the pressure sensing device with respect to the reference point and the pressure sensor detecting a pressure to deflect a local area on the surface of the target object.

17. The device of claim 15 wherein the noncontact distance measuring device is a laser distance measuring device.

18. The device of claim 15 wherein the scanner has a size and shape to be gripped by a hand of a human operator.

19. The device of claim 1 wherein the computer has an output device, the computer using the calculated surface points to generate a three-dimensional image of the target object on the output device.

20. An apparatus for obtaining data indicative of a surface of a target object, comprising:

a free-motion scanner adapted to be moved about the target object substantially without restriction;

a noncontact measuring device attached to the scanner that measures a distance between the scanner and the target object;

a tracking system to detect a position and orientation of at least one of the scanner and the target object with respect to a reference point;

a computer operatively coupled to the tracking system and the noncontact measuring device, the computer correlating position and orientation measurements of the at least one of the scanner and the target object from the position tracking system with corresponding distance measurements between the scanner and the target object from the noncontact measuring device to calculate a plurality of surface point measurements indicative of the surface of the target object, and a pressure sensing device operatively coupled to the computer the pressure sensing device measuring a pressure to deflect a local area on the surface of the target object.

21. The apparatus of claim 20 wherein the noncontact measuring device comprises a laser distance measuring device.

22. The apparatus of claim 20 wherein the noncontact measuring device comprises an acoustic measuring device.

23. The apparatus of claim 20 wherein the tracking system comprises an emitter that generates a position reference field and a first spatial sensor attached to the scanner that senses the position and orientation of the noncontact distance measuring device with respect to the position reference field.

24. The apparatus of claim 23 wherein:

the emitter comprises a base magnet and the position reference field is a magnetic field generated by the magnet; and the first spatial sensor is first magnet, wherein displacement between the base magnet and the first magnet produces an electrical signal indicating a position and orientation of the first magnet with respect to the base magnet.

25. The device of claim 20 wherein the scanner comprises a pistolshaped member having a handle and a pointer, the distance measuring device being attached to the pointer.

26. The device of claim 25 wherein the distance measuring device is a laser distance measuring device that impinges a laser beam against the target object.

27. The device of claim 20, further comprising an optical sensor attached to the scanner and operatively coupled to the computer to sense a color of the target object corresponding to a surface point of the target object.

28. The device of claim 27 wherein the optical sensor is a video camera.

29. The device of claim 20 wherein the pressure sensing device comprises a housing having a size and shape to attach to a finger of a human operator, and a pressure sensor attached to the housing and operatively coupled to the computer, the tracking system detecting the position of the pressure sensing device with respect to the fixed point and the pressure sensor detecting a pressure to deflect a local area on the surface of the target object.

30. An apparatus for obtaining data indicative of a surface of a target object, comprising:

a free-motion scanner adapted to be moved about the target object substantially without restriction;

a noncontact measuring device attached to the scanner that measures a distance between the scanner and the target object;

a tracking system to detect a position and orientation of each of the scanner and the target object with respect to a reference point the tracking system including an emitter that generates a position reference field, a first spatial sensor attached to the scanner that senses the position and orientation of the noncontact distance measuring device with respect to the position reference field, and a second spatial position sensor attached to the target object that detects the position and orientation of the target object in the position reference field;

a computer operatively coupled to the first spatial sensor, the second spatial sensor and the noncontact measuring device, the computer correlating position and orientation measurements of the scanner and the target object from the first and second spatial position sensors, respectively, with corresponding distance measurements between the scanner and the target object from the noncontact measuring device to calculate a plurality of surface point measurements and generate a three-dimensional image of the target object.

31. The device of claim 30 wherein the noncontact measuring device is a laser distance measuring device.

32. The device of claim 30 wherein:

the emitter comprises a base magnet and the position reference field is a magnetic field emitted by the magnet;

the first spatial sensor is first magnet, wherein displacement between the base magnet and the first magnet produces a first electrical signal indicating a position and orientation of the scanner with respect to the base magnet; and the second spatial sensor is a second magnet, wherein displacement between the base magnet and the second magnet produces a second electric signal indicating a position and orientation of the target object with respect to the base magnet.

33. The device of claim 32 wherein the noncontact measuring device is a laser distance measuring device.

34. A method for three-dimensional imaging of a target object, comprising the steps of:

generating a plurality of surface point measurements corresponding to points on the surface of the target object from a noncontact free-motion scanner, the surface point measurements being generated without mechanically contacting the surface of the target object;

processing the plurality of surface point measurements to approximate the surface of the target object;

sensing at least one of a color measurement of a color of the target object or a deflection measurement of a deflection of the target object under the influence of a force at the surface point measurements; and correlating the at least one of the color measurement or the deflection measurement with the surface point measurements.

35. The method of claim 34 wherein the generating step comprises:

determining a position of the noncontact scanner with respect to a position reference field about the target object;

measuring a distance between the noncontact scanner and the target object without mechanically contacting the target object;

correlating the distance measurement between the noncontact scanner and the target object with the position of the noncontact scanner to define a surface point measurement; and pointing the scanner at a different location of the target object and repeating the determining, measuring, and correlating steps.

36. The method of claim 35 wherein the step of measuring the distance between the target object and the noncontact scanner comprises impinging a laser beam against the surface of the target object and detecting a return portion of the laser beam reflecting from the target object.

37. The method of claim 35 wherein an emitter is positioned proximate to the target object and a first spatial position sensor is attached to the scanner, the step of determining the position of the noncontact scanner comprising emitting a position reference field about the target object from the emitter and sensing a signal from the first spatial position sensor indicating a relative position between the first sensor and the emitter.

38. The method of claim 37 wherein the step of measuring the distance between the target object and the noncontact scanner comprises impinging a laser beam against the surface of the target object and detecting a return portion of the laser beam reflecting from the target object.

39. The method of claim 34 wherein the processing step comprises:

evaluating the plurality of surface point measurements to determine a plurality of surface data points;

generating polygonal approximations of portions of the surface from the plurality of surface data points; and forming a three-dimensional image from the polygonal approximations.

40. The method of claim 39 wherein the step of evaluating the plurality of surface point measurements comprises denoting a distance between a first surface point measurement and a second surface point measurement, maintaining separate surface data points for both the first and second surface point measurements when the distance is greater than a minimum value, and creating a single adjusted surface data point when the distance between the first and second surface point measurements is less than the minimum value.

* * * * *